June 29, 1971  E. MITTMAN  3,589,973

SUEDE TYPE PRODUCT

Filed Oct. 31, 1966

- INVENTOR
EMANUEL MITTMAN

BY

ATTORNEY

United States Patent Office

3,589,973
Patented June 29, 1971

3,589,973
SUEDE TYPE PRODUCT
Emanuel Mittman, Forest Hills, N.Y., assignor to
W. R. Grace & Co., New York, N.Y.
Filed Oct. 31, 1966, Ser. No. 590,868
Int. Cl. B32b 3/00
U.S. Cl. 161—116                    2 Claims

ABSTRACT OF THE DISCLOSURE

A synthetic polymeric sheet is disclosed having a suede-like appearance formed by cone-like surface indentations.

---

The present invention relates to a novel sheet material, and more specifically to a useful and attractive synthetic polymeric material which possesses the appearance and texture of suede-type materials.

Suede-type materials as prepared from natural leather have long been used as a premium material in the making of apparel such as coats, shoes and handbags. The relatively high cost of natural leather suede has induced prior art workers to develop synthetic substitutes for natural suede. These synthetic products are normally produced by pressing a thermoplastic polymer, such as polyvinylchloride, on an embossing plate which contains a multiplicity of small holes. The resultant product has a pile like finish and possesses 400–25,000 projections per sq. inch. One example of such a product is that disclosed by Wisotzky in U.S. Pat. No. 3,235,438.

While prior art synthetic suede materials closely resemble the appearance of suide prepared from natural leather, it has been found that these products tend to entrap soil and are almost impossible to clean.

It is therefore an object of the present invention to provide a novel synthetic product which possesses a suede-like appearance.

It is another object to provide a synthetic suede-like material which does not entrap soil and is easy to maintain in a cleaned condition.

Figure 1:
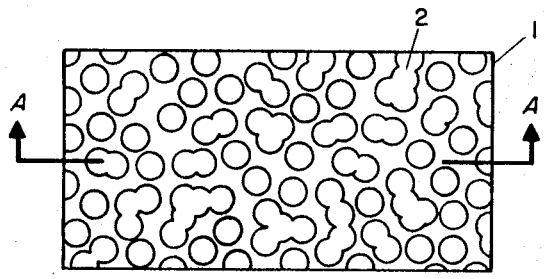
Figure 2:

These objects, and others, will become readily apparent to one skilled in the art from the following detailed description and accompanying drawing wherein:

FIG. 1 is a plan top view of the present material as shown in enlarged scale; and FIG. 2 is a cross section taken along line A—A of FIG. 1.

Broadly, my present invention comtemplates a novel material which comprises a sheet of thermoplastic synthetic polymer having a multiplicity of small indentations therein.

More specifically, I have found that an extremely attractive and durable suede-like material may be prepared by indenting a thermoplastic sheet from about 400 to about 25,000 surface indentations per sq. inch. The individual indentations have a conical shape, a depth of from about 0.002 to about 0.5 inch, and a surface diameter of from about 0.002 to about 0.2 inch. This product has a flat-mat finish which has the appearance of suede. The suede-like appearance is totally unexpected due to the fact the present product has a plurality of indentations in lieu of fine hair-like projections normally found in prior art synthetic and natural suede-type products. Due to the fact there are no fine projections to catch and entrap soil, my product remains clean for extended periods and is easy to clean when soiled.

In referring to FIG. 1, it is seen that the present suede material comprises a flat sheet-like material 1 which has placed therein a plurality of conically shaped indentations indicated as 2. it is noted that the indentation 2 is placed upon the sheet-like material 1 in a random manner. Therefore, these indentations may overlay at numerous places or may constitute a single non-connected indentation into the sheet. Referring to FIG. 2, which is a cross section taken along line A—A of FIG. 1, it is seen that the indentations 2 are disposed into sheet 1 for a considerable distance. Due to the fact that indentations 2 are random in nature, the indentations 2 as shown in FIG. 2 occur at varying distances from each other.

The thermoplastic material from which the present product is prepared may be selected from that group of synthetic polymers which may be processed by a conventional embossing technique. Ordinarily these products should be capable of being processed at temperatures ranging from 200 to 400° F. and should possess the flexibility characteristics required by a relatively thin sheet-like material which is to be utilized in the fabrication of suede-type products. Typical thermoplastic polymers which may be utilized in the practice of the present invention are polyvinylchloride, polyethylene, polyamides and polypropylene. These synthetics polymers may be plasticized with a variety of plasticizers such as dioctylphthalate.

The plates which are used to prepare the present material may be prepared by any well known prior art technique. Generally, the plates are prepared by first piercing a relatively soft metal plate, such as lead or brass, with a hardened set of needles having the desired dimension. An impression may be taken from the pierced master plate which represents the surface thereof in reverse. This impression may then be reproduced in a hard metal such as nickel, using ordinary electrolytic plating techniques. The finished plate therefore comprises a hard metal plate having essentially conical shaped hair-like projections which number from about 400 to 25,000 per sq. inch, and have dimensions ranging from 0.002 to 0.5 inch in length and a maximum surface diameter in the range of from about 0.002 to 0.2 inch. This plate may be either flat or prepared in the form of a roll which is adapted to continuous procedures.

The actual processing procedure is carried out in a conventional manner wherein the softened thermoplastic paterial in sheet form is subjected to the action of the embossing plate which contains the desired number of hair-like projections. Ordinarily this procedure will take place at a temperature ranging from about 200 to 400° F.

In a specific embodiment of the present invention plate was prepared by first preparing a pierced pattern plate containing approximately 15,000 indentations per sq. inch. having a diameter on the order of 0.008 inch in depth and an average diameter of approximately 0.01 inch. These indentations are substantially conical in shape and the surface of this pattern plate represents essentially the surface of the final product. A positive copy of the pierced plate was prepared by preparing an impression of the surface thereof. This impression was then reproduced in hard metal using a conventional technique.

This plate was then placed in a conventional plate type press and a polyvinylchloride sheet material softened at about 300° F. was placed in the press and the impression plate pressed therein. The resultant product, as illustrated in FIGS. 1 and 2, possessed a plurality of indentations corresponding to the positive projections on the impression plate. This final product possessed a fine mat-like appearance which closely resembled that of natural or synthetic suede. This product did not have the inherent tendency to pick up soil that natural or synthetic suede having hair-like projections, in lieu of indentations, possesses.

While the invention has been described with reference to a conventional plate type press, it is obvious that a rolling operation would likewise be suitable for the preparation of products of the present invention. Also, the plate or roller can be of the conventional soft metal type as well as the electro-plated hard metal type.

Many other equivalent modifications will become apparent to those skilled in the art from a reading of the foregoing with a departure from the inventive concept.

I claim:
1. A synthetic polymeric sheet having a suede-like appearance which consists of a synthetic polymer sheet containing from about 400 to about 25,000 conically-shaped surface indentations per square inch, said conically-shaped surface indentations disposed with the apexes thereof beneath the surface of the polymer sheet to a depth penetration of a thickness less than the thickness of the sheet and from about 0.002 to about 0.5 inch, and a surface conical base diameter of from about 0.002 to about 0.2 inch.

2. The synthetic polymeric sheet of claim 1 wherein the synthetic polymer is polyvinylchloride.

References Cited

UNITED STATES PATENTS

| | | | |
|---|---|---|---|
| 2,994,617 | 8/1961 | Proctor | 117—4 |
| 3,235,438 | 2/1966 | Wisotzky | 161—116 |
| 2,817,597 | 12/1957 | Alderfer | 161—117 |
| 3,041,193 | 6/1962 | Hamway et al. | 161—Vinyl |
| 3,312,586 | 4/1967 | Barlow | 161—Vinyl |

MORRIS SUSSMAN, Primary Examiner

U.S. Cl. X.R.

117—4